(12) United States Patent
Bedetti

(10) Patent No.: US 7,785,491 B2
(45) Date of Patent: Aug. 31, 2010

(54) PROCESS AND BURNER FOR HYDROCARBON PARTIAL OXIDATION

(75) Inventor: Gianfranco Bedetti, Milan (IT)

(73) Assignee: Casale Chemicals S.A. (CH)

( * ) Notice: Subject to any disclaimer, the term of this patent is extended or adjusted under 35 U.S.C. 154(b) by 0 days.

(21) Appl. No.: 12/256,195

(22) Filed: Oct. 22, 2008

(65) Prior Publication Data

US 2009/0053128 A1     Feb. 26, 2009

Related U.S. Application Data

(63) Continuation of application No. 11/150,984, filed on Jun. 13, 2005, now abandoned.

(30) Foreign Application Priority Data

Jun. 18, 2004    (EP) .................................. 04014343

(51) Int. Cl.
*C01B 3/24* (2006.01)
(52) U.S. Cl. ..................................................... 252/373
(58) Field of Classification Search ................... 252/373
See application file for complete search history.

(56) References Cited

U.S. PATENT DOCUMENTS

| | | | | |
|---|---|---|---|---|
| 2,655,442 A * | 10/1953 | Mayland | ..................... | 48/127.9 |
| 3,232,728 A * | 2/1966 | Reynolds | ..................... | 48/215 |
| 3,705,108 A * | 12/1972 | Marion et al. | ................ | 252/373 |
| 3,738,940 A * | 6/1973 | Auer et al. | ................... | 252/373 |
| 3,846,095 A * | 11/1974 | Crouch | ......................... | 48/213 |
| 3,847,564 A | 11/1974 | Marion et al. | | |
| 4,006,099 A * | 2/1977 | Marion et al. | ................ | 252/373 |
| 4,006,100 A * | 2/1977 | Crouch | ........................ | 252/373 |
| 4,371,379 A * | 2/1983 | Brent et al. | ................ | 48/197 R |
| 4,491,456 A * | 1/1985 | Schlinger | .................. | 48/197 R |
| 4,999,029 A * | 3/1991 | Lueth et al. | ................ | 48/197 R |
| 5,653,916 A * | 8/1997 | Disselhorst et al. | ......... | 252/373 |
| 5,935,489 A * | 8/1999 | Hershkowitz et al. | ....... | 252/373 |
| 6,692,661 B1 * | 2/2004 | Bedetti | ....................... | 252/373 |

FOREIGN PATENT DOCUMENTS

| | | |
|---|---|---|
| EP | 0997433 A1 | 5/2000 |
| GB | 2151348 A1 | 7/1985 |

* cited by examiner

*Primary Examiner*—Wayne Langel
(74) *Attorney, Agent, or Firm*—Akerman Senterfitt

(57) ABSTRACT

A hydrocarbon partial oxidation process for obtaining gaseous mixtures comprising hydrogen and carbon monoxide is carried out through a burner (10) comprising a mixing chamber (12) that has an inner side wall (12*a*) extending between at least one inlet opening (23, 23*a*) and an outlet opening (24), independent gaseous flows of hydrocarbons and oxygen, respectively, being continuously fed into said mixing chamber (12) to form a gaseous mixture advancing towards said outlet opening (24) to be fed into a combustion chamber (14) of the gaseous mixture itself, into said mixing chamber (12) and substantially in contact with the inner side wall (12*a*) thereof, a flow of an inert fluid is also fed in equicurrent to said gaseous mixture, with formation of a respective annular flow of inert fluid, enveloping said gaseous mixture from which it is substantially separated by a respective inner limit layer, said annular flow of inert fluid having, at said limit layer, an advancing speed at least equal to the speed of propagation of the flame in said gaseous mixture.

8 Claims, 1 Drawing Sheet

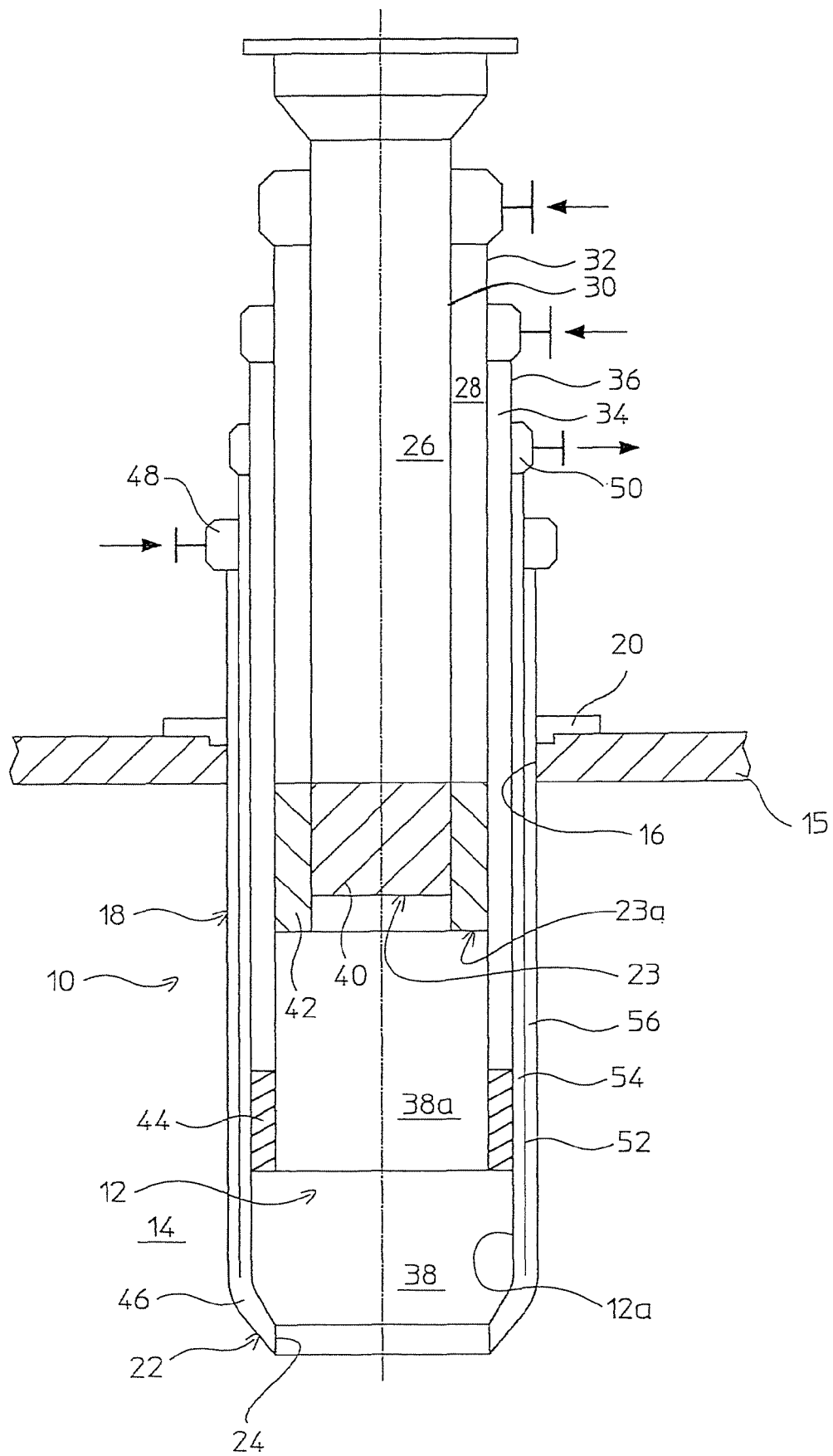

PROCESS AND BURNER FOR HYDROCARBON PARTIAL OXIDATION

FIELD OF APPLICATION

The present invention refers to a hydrocarbon partial oxidation process for obtaining gaseous mixtures comprising hydrogen and carbon monoxide like, for example, synthesis gas, combustible gas or reduction gas.

In particular, the present invention refers to a hydrocarbon partial oxidation process through a burner comprising a mixing chamber that has an inner side wall extending between at least one inlet opening and an outlet opening, independent gaseous flows of hydrocarbons and oxygen, respectively, being continuously fed into said mixing chamber to form a gaseous mixture advancing towards said outlet opening to be fed into a combustion chamber of the gaseous mixture itself.

In the rest of the description and in the subsequent claims, with the term "hydrocarbons" we mean to generically indicate a hydrocarbon or mixtures of hydrocarbons that can be saturated and/or unsaturated, light and/or heavy (for example C1-C6); with the term "gaseous flow of hydrocarbons", on the other hand, we mean to indicate a fluid comprising gaseous hydrocarbons, such as methane or natural gas, or else a gaseous flow comprising solid fuels in suspension (for example coal slack or carbon-black).

PRIOR ART

As known, to obtain synthesis gases or other similar gaseous mixtures comprising hydrogen and carbon monoxide (which are used for example in the production of ammonia and methanol) through hydrocarbon partial oxidation carried out with suitably structured burners, there is an ever increasing requirement to realize a high-yield process, which is easy to carry out and does not require high energy consumption and operating costs.

In order to satisfy the aforementioned requirement, processes are generally used according to which the gaseous flows comprising oxygen and hydrocarbons, respectively, are fed and made to react for the desired partial oxidation of the hydrocarbons, in a combustion chamber, also known as gassifier, where a flame forms. Structurally, the burner is at least partially inserted into the gassifier.

In accordance with the prior art, the axial speed of feeding of the two gaseous flows into the burner must be sufficiently high to prevent the flame from returning towards the burner.

Although advantageous from various points of view, the partial oxidation processes of hydrocarbons according to this prior art, i.e. that of so-called diffusion burners, have recognized drawbacks, including, in particular, a production of carbon-black due to a substantial pyrolization of those hydrocarbons that, in the combustion chamber, come into contact and mix with the hot gases produced by the combustion, before being able to be suitably mixed with oxygen.

Moreover, the production of carbon-black in the combustion chamber has a negative influence both on the global yield of the oxidation process intended to be realized, with particular reference to the smaller amount of hydrogen and carbon monoxide that can be obtained per unit of burnt hydrocarbon, and on the operation of the plants downstream of the gassifier. Indeed, it is necessary to separate the carbon-black from the reaction products to prevent, for example, it from dirtying apparatuses downstream of the gassifier, such as a possible boiler or a possible catalyst (with the result of poisoning it).

Resulting from this, for such a separation, there is a need for a whole series of operating steps that involve relative energetic consumption, high complexity of the plant and high maintenance costs.

In order to overcome the aforementioned drawbacks, partial oxidation processes of hydrocarbons have been adopted that allow the production of carbon-black to be reduced, but they have the major disadvantage of having to operate in the combustion chamber with very high temperatures (in the order of 1300-1400° C.), therefore with high oxygen consumption, a consequent low conversion yield and high operating costs.

In the prior art processes have also been researched in which the gaseous flows comprising oxygen and hydrocarbons, respectively, are preliminarily intimately mixed in a mixing chamber provided in the burner itself, before their entry into the combustion chamber, so as to avoid the formation of carbon-black.

However, this type of solution (burners with premixing) has never been realized with hydrocarbon gaseous flows because this involves a recognized and very serious drawback, i.e. the high risk of the flame returning towards the mixing chamber itself of the burner.

SUMMARY OF THE INVENTION

The problem underlying the present invention is that of providing a process for hydrocarbon partial oxidation, capable of satisfying the requirement outlined above, at the same time overcoming the quoted drawbacks with reference to the prior art in a simple and cost-effective way.

This problem is solved, according to the present invention, by a hydrocarbon partial oxidation process through a burner comprising a mixing chamber that has an inner side wall extending between at least one inlet opening and an outlet opening, independent gaseous flows of hydrocarbons and oxygen, respectively, being continuously fed into said mixing chamber to form a gaseous mixture advancing towards said outlet opening to be fed into a combustion chamber of the gaseous mixture itself, characterized in that, into said mixing chamber and substantially in contact with the inner side wall thereof, a flow of an inert fluid is also fed in equicurrent to said gaseous mixture, with formation of a respective annular flow of inert fluid, enveloping said gaseous mixture from which it is substantially separated by a respective inner limit layer, said annular flow of inert fluid having, at said limit layer, an advancing speed at least equal to the speed of propagation of the flame in said gaseous mixture.

Further characteristics and the advantages of the process for hydrocarbon partial oxidation according to the present invention shall become clearer from the description, made hereafter, of a preferred embodiment thereof, given for indicating and not limiting purposes, with reference to the attached drawings.

BRIEF DESCRIPTION OF THE DRAWING

The FIGURE schematically represents a longitudinal section of a burner for hydrocarbon partial oxidation according to the present invention.

DETAILED DESCRIPTION OF A PREFERRED EMBODIMENT

With reference to the FIGURE, a burner for hydrocarbon partial oxidation, for obtaining gaseous mixtures comprising hydrogen and carbon monoxide, in accordance with the present invention is shown and it is globally indicated with reference numeral 10.

Said burner 10 is at least partially inserted into a combustion chamber 14 of a gassifier, per se conventional and therefore not represented in detail, and comprises a mixing chamber 12 that is in fluid communication with the combustion chamber 14.

The mixing chamber 12 has an inner side wall 12a extending between an inlet opening 23 and an outlet opening 24. Independent gaseous flows of hydrocarbons and oxygen, respectively, are continuously fed into said mixing chamber 12 to form a gaseous mixture advancing towards said outlet opening 24 to be fed into said combustion chamber 14 of the gaseous mixture itself. More specifically, the independent gaseous flows are fed into the mixing chamber 12 from an inlet opening 23 and from a further inlet opening 23a, arranged in an intermediate position between said inlet opening 23 and said outlet opening 24, preferably close to the inlet opening 23 as is shown in the example of the FIGURE. Alternatively, the further inlet opening 23a can be arranged, in the burner 10, at the same height as the inlet opening 23.

Preferably, the inlet opening 23 feeds the flow of oxygen whereas the inlet opening 23a feeds the flow of hydrocarbon.

Going into greater detail, the combustion chamber 14 is defined by a wall 15 that is equipped with a circular opening 16 in which a cylindrical body 18 of the burner 10 is partially inserted. The cylindrical body 18 is fixed to the circular opening 16 of the wall 15 through a flange 20, arranged outside the cylindrical body 18.

The cylindrical body 18 at one end 22 defines said mixing chamber 12 that is cylindrical-shaped, with cylindrical side wall 12a, said end 22 being the end of the cylindrical body 18 inserted into the combustion chamber 14. The end 22 has said outlet opening 24 that puts said mixing chamber 12 in communication with said combustion chamber 14.

A duct 26 carrying oxygen and a duct 28 carrying hydrocarbons are connected to the two inlet openings 23 and 23a of the mixing chamber 12, respectively. More specifically, the two ducts 26 and 28 are substantially two cylindrical pipes, inner 30 and outer 32, coaxial and concentric, contained in the cylindrical body 18: the inner pipe 30 feeds oxygen and the annular interspace between the two inner 30 and outer 32 pipes feeds hydrocarbons.

In particular, in accordance with an advantageous aspect of the present invention, such a mixing chamber 12 is also fed by a duct 34 carrying inert fluid. More precisely, the duct 34 is arranged in such a way that the inert fluid licks said side wall 12a of the mixing chamber 12.

In the present application, by inert fluid we mean a fluid that prevents the generation and propagation of the flame, in the combustion operative conditions present in the gassifier. Preferably an inert gas such as steam is used. Other pure gases (for example pure nitrogen), or mixtures of gases that have the aforementioned characteristic can be used.

Preferably, the flow of inert fluid is fed close to the outlet opening 24 of the mixing chamber 12.

Preferably, the duct 34 carrying inert fluid is substantially a cylindrical pipe 36, arranged coaxially and concentrically with the outer pipe 32 and contained in the cylindrical body 18: the annular interspace between the cylindrical pipe 36 and the outer pipe 32 feeds the inert fluid.

Advantageously, the cylindrical pipe 36 constitutes the inner side wall of the cylindrical body 18, an end portion of the side wall 12a of the mixing chamber 12 being formed by a portion of cylindrical pipe 36 that is situated close to the opening 24 of the cylindrical body 18: said portion of cylindrical pipe 36 defines a cylindrical portion 38 of the mixing chamber 12.

The outer pipe 32, which, as stated, is coaxial to the cylindrical pipe 36, is shorter than the cylindrical pipe 36.

Moreover, the inner pipe 30, which, as stated, is coaxial to the outer pipe 32, is shorter than the outer pipe 32.

Since, as stated, the inner pipe 30 feeds the oxygen and the interspace between the two inner 30 and outer 32 pipes feeds the hydrocarbons, a further cylindrical portion 38a of mixing chamber 12 is formed between the end of the inner pipe 30 and the end of the outer pipe 32, defined by a portion of outer pipe 32.

Preferably, in the end portion of the inner pipe 30, in the end portion of the interspace between inner pipe 30 and outer pipe 32 and in the end portion of the interspace between outer pipe 32 and cylindrical pipe 36, per se known swirlers 40, 42 and 44 are respectively provided. In practice, the end of the swirler 40 constitutes the inlet opening 23 and the end of the swirler 42 constitutes the further inlet opening 23a.

It should also be specified that, in the wall of the pipe 36 that defines the portion of cylindrical body 18 inserted in the combustion chamber 14, a cylindrical recess 46 is advantageously provided, in fluid communication with an inlet fitting 48 and an outlet fitting 50 of a cooling fluid.

The inlet 48 and outlet fitting 50 are arranged outside of the combustion chamber 14 and in the cylindrical recess 46 a cylindrical baffle 52 is provided that defines two coaxial and concentric inner and outer cylindrical chambers 54 and 56, in fluid communication with each other and, respectively, with the inlet fitting 48 and with the outlet fitting 50. Advantageously, the cylindrical chamber 54 defines a portion of the inner side wall of the cylindrical body 18, and in particular defines the duct 34 carrying inert fluid and the end portion of the side wall 12a of the mixing chamber 12.

It should also be specified that the opening 24 is circular and that it is formed by the end 22 of the cylindrical body 18, which is preferably tapered towards the centre.

The operation of the burner for hydrocarbon partial oxidation according to the invention is specified hereafter.

In short, a hydrocarbon partial oxidation process according to the invention, through a burner 10 comprising a mixing chamber 12 that has an inner side wall 12a extending between at least one inlet opening 23 and an outlet opening 24, comprises the continuous feeding into said mixing chamber 12 of independent gaseous flows of hydrocarbons and oxygen, respectively, to form a gaseous mixture advancing towards said outlet opening 24 to be fed into a combustion chamber 14 of the gaseous mixture itself.

According to an aspect of the present invention, the process also comprises a step of feeding, into said mixing chamber 12 and substantially in contact with the inner side wall 12a thereof, of a flow of an inert fluid in equicurrent to said gaseous mixture, with formation of a respective annular flow of inert.

This annular flow envelops said gaseous mixture and it is substantially separated from it by a respective inner limit layer. The annular flow of inert has, at said limit layer, an advancing speed at least equal to the speed of propagation of the flame in said gaseous mixture.

In other words, the gaseous mixture that advances in the mixing chamber 12 towards the combustion chamber 14 has a substantially parabolic speed profile, with maximum advancing speed substantially at the centre of the mixing chamber 12 and substantially zero speed at the inner side wall 12a of said mixing chamber 12.

In the combustion chamber 14 the gaseous mixture is made to react, obtaining a flame and a gaseous flow comprising hydrogen and carbon monoxide, said flame having a predetermined speed of propagation in a saturated environment of said gaseous mixture.

In practice, the flow of inert fluid licks said side wall 12a of the mixing chamber 12 up to a determined distance from said side wall 12a, i.e. up to a distance that corresponds to the aforementioned inner limit layer.

The flow of inert fluid has substantially zero speed at the side wall 12a of said mixing chamber 12 and increasing speed in a substantially parabolic manner as one moves away from the side wall 12a up to a maximum speed of said inert fluid at said determined distance from the side wall 12a, i.e. at the distance of the inner limit layer.

The gaseous mixture thus takes on a substantially parabolic speed profile, with maximum advancing speed substantially at the centre of the mixing chamber 12 and minimum speed substantially equal to said maximum speed of the inert fluid at said predetermined distance from the side wall 12a: said maximum speed of the inert fluid, according to the invention, is greater than said speed of propagation of the flame.

More specifically, the flow of oxygen, which is fed from the inner pipe 30, mixes in the further portion 38a of mixing chamber 12 with the flow of hydrocarbons.

The mixing speed is increased by feeding the flow of hydrocarbons and the flow of oxygen at substantially the same axial speed. The flows of hydrocarbons and oxygen respectively cross the swirlers 40 and 42, which give each of the two flows helical motion, in opposite directions with respect to each other.

Preferably, the opposite helical motions have momentum of momentum of substantially the same value: in this way, the mixed flow shall advantageously just have the axial speed component.

Alternatively, it is possible to provide just one of the swirlers 40 and 42, consequently giving helical motion to just one flow.

Leaving the further portion 38a of mixing chamber 12, the gaseous mixture thus obtained has a substantially parabolic speed profile, with maximum advancing speed substantially at the centre of the further portion 38a of mixing chamber 12 and substantially zero speed at the outer pipe 32.

The gaseous mixture then enters into the portion 38 of the mixing chamber 12, where the flow of inert fluid coming from the interspace between outer pipe 32 and cylindrical pipe 36 is fed.

In the case in which the swirler 44 is provided, helical motion is given to the flow of inert fluid.

However, the flow of inert fluid has a speed profile that, starting from substantially zero speed at the side wall 12a, increases up to a maximum speed of the inert fluid at a determined distance from the side wall 12a: such a distance varies according to the operating conditions of the speeds used and can, for example, be between 0.5 and 3 mm, preferably between 1 and 2 mm.

In the portion 38 of the mixing chamber 12, the gaseous mixture takes on a substantially parabolic speed profile, with maximum advancing speed substantially at the centre of the portion 38 and speed substantially equal to the maximum speed of the contiguous flow of inert fluid at the predetermined distance from the side wall 12a.

In other words, according to the invention, the gaseous mixture is surrounded, in the annular zone in contact with the side wall 12a of the mixing chamber 12, by the aforementioned annular flow that advances in the same direction as the gaseous mixture.

According to the invention, it is necessary that everywhere the maximum speed of the inert fluid is greater than the speed of propagation of the flame, so as to preclude the possibility of the flame generated in the combustion chamber 14 from propagating towards the mixing chamber 12. In the aforementioned conditions, the flame that develops in the combustion chamber 14 cannot develop in the mixing chamber 12 precisely because the gaseous mixture that can burn has a greater speed than the speed of propagation of the flame.

The main advantage achieved by the process for hydrocarbon partial oxidation of the present invention lies precisely in the fact of preventing the return of the flame into the burner with premixing. In other words, with the present invention the very serious risk of the possible return of the flame, which up to now has prevented the use of burners with premixing, is overcome.

Of course, the man skilled in the art can bring numerous modifications and variants to the process for hydrocarbon partial oxidation described above in order to satisfy specific and contingent requirements, all of these modifications and variants in any case being covered by the scope of protection of the invention, as defined by the following claims.

The invention claimed is:

1. A hydrocarbon partial oxidation process for obtaining gaseous mixtures comprising hydrogen and carbon monoxide, through a burner comprising a mixing chamber that has an inner side wall extending between at least one inlet opening and an outlet opening, wherein the process comprises:

continuously feeding first and second independent gaseous flows of hydrocarbons and oxygen, respectively, into said mixing chamber;

mixing said first and second independent gaseous flows to form a gaseous mixture advancing towards said outlet opening to be fed into a combustion chamber downstream of the burner;

reacting said gaseous mixture in the combustion chamber so as to obtain a flame and a gaseous flow comprising hydrogen and carbon monoxide, the flame having a predetermined speed of propagation in a saturated environment of said gaseous mixture; and feeding a third flow of an inert fluid into said mixing chamber and substantially in contact with the inner side wall thereof, in equicurrent to said gaseous mixture, to form a respective annular flow of inert fluid, enveloping said gaseous mixture from which it is substantially separated by a respective inner limit layer, said annular flow of inert fluid having, at said limit layer, an advancing speed at least equal to the speed of propagation of the flame in said gaseous mixture.

2. The partial oxidation process according to claim 1, wherein the flow of inert fluid is fed close to the outlet opening of the mixing chamber.

3. The partial oxidation process according to claim 1, wherein a helical motion is given to the flow of inert fluid.

4. The partial oxidation process according to claim 1, wherein the flow of hydrocarbons and the flow of oxygen are fed at substantially the same axial speed.

5. The partial oxidation process according to claim 4, wherein a helical motion is given to at least one among the flow of hydrocarbons and the flow of oxygen.

6. The partial oxidation process according to claim 5, wherein, to the flow of hydrocarbons and to the flow of oxygen, helical motions are given in opposite directions with respect to each other.

7. The partial oxidation process according to claim 6, wherein said opposite helical motions have substantially the same momentum of momentum values.

8. The partial oxidation process according to claim 1, wherein said inert fluid is steam.

* * * * *